(12) United States Patent
Kubota et al.

(10) Patent No.: US 7,881,366 B2
(45) Date of Patent: Feb. 1, 2011

(54) MOVING PICTURE ENCODER

(75) Inventors: Tomonori Kubota, Kawasaki (JP);
Makiko Konoshima, Kawasaki (JP);
Yuichiro Teshigahara, Kawasaki (JP);
Hiroyuki Masatsugu, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1401 days.

(21) Appl. No.: 11/342,975

(22) Filed: Jan. 31, 2006

(65) Prior Publication Data

US 2007/0098084 A1 May 3, 2007

(30) Foreign Application Priority Data

Oct. 31, 2005 (JP) ............................. 2005-317632

(51) Int. Cl.
*H04B 1/66* (2006.01)
*H04N 7/12* (2006.01)
(52) U.S. Cl. .............. 375/240; 375/240.03; 375/240.12
(58) Field of Classification Search .................. 375/240, 375/240.01–240.03, 240.12, 240.24
See application file for complete search history.

(56) References Cited

U.S. PATENT DOCUMENTS

| 5,565,921 A | 10/1996 | Sasaki |
| 2004/0096113 A1* | 5/2004 | Taima .................... 382/239 |
| 2006/0215759 A1* | 9/2006 | Mori .................. 375/240.16 |

FOREIGN PATENT DOCUMENTS

| JP | 06-268997 A | 9/1994 |
| JP | 08-009374 A | 1/1996 |
| JP | 9-130732 | 5/1997 |
| JP | 10-066092 A | 3/1998 |
| JP | 10-145779 | 5/1998 |
| JP | 10-304379 | 11/1998 |
| JP | 2001-204018 A | 7/2001 |
| JP | 2002-152669 | 5/2002 |

* cited by examiner

*Primary Examiner*—David B Lugo
(74) *Attorney, Agent, or Firm*—Fujitsu Patent Center

(57) ABSTRACT

In encoding of moving pictures, I-frame is inserted when a scene change occurs. If scene changes frequently occur in the range of a predetermined amount-of-information allocation, the amount of information allocated to an encoding process on I-frame becomes enlarged. Therefore, the amount of information cannot be sufficiently reserved for another coding, thereby considerably degrading the quality of an image. Thus, a scene change detection threshold is obtained depending on the remainder in the VBV buffer, the scene change detection threshold is compared with a scene change detection value for determination of the occurrence of a scene change, and it is determined whether or not a scene change has occurred based on the comparison result.

17 Claims, 17 Drawing Sheets

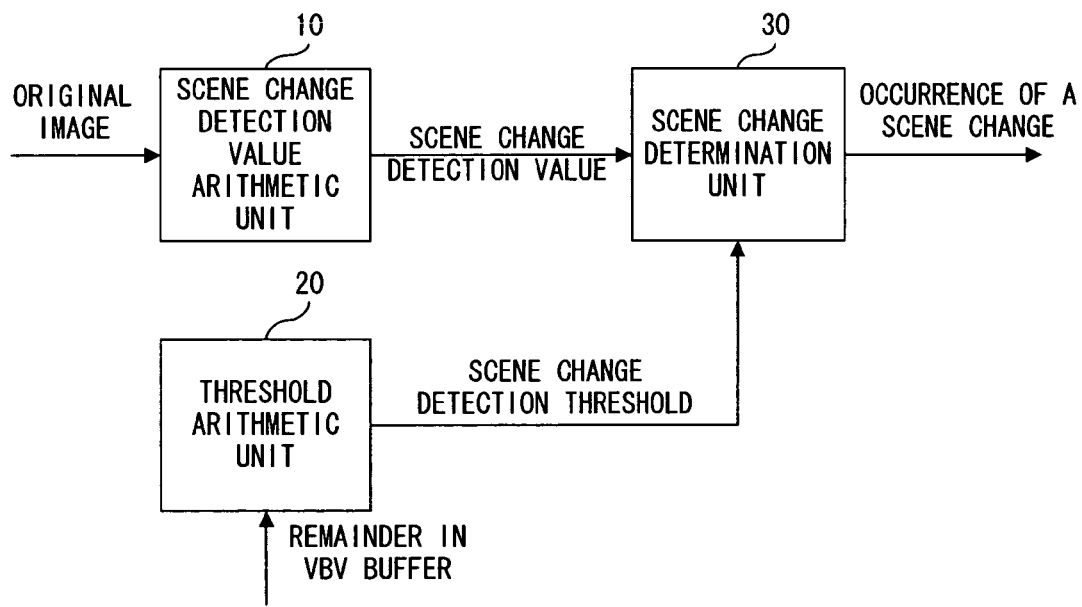
F I G. 5

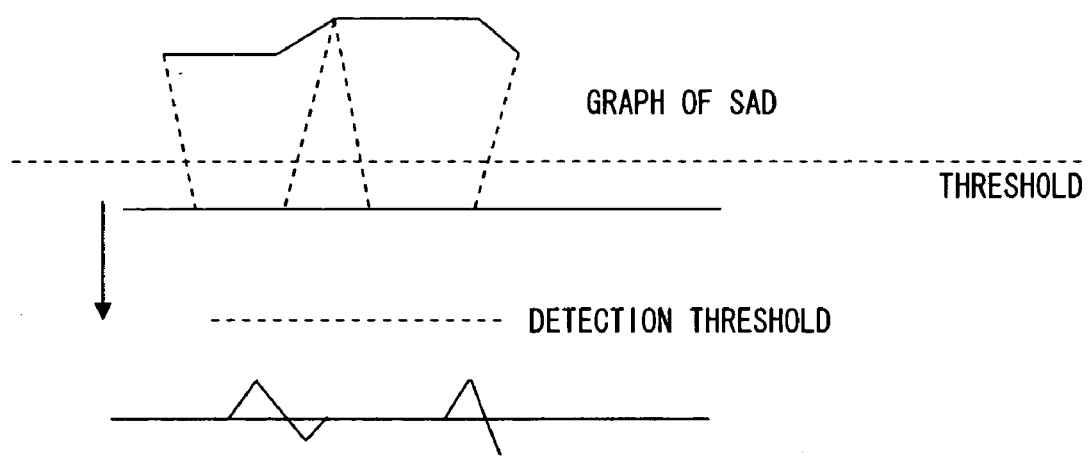
F I G. 9

MOVING PICTURE ENCODER

CROSS-REFERENCE TO RELATED APPLICATIONS

This application is based upon and claims the benefit of priority from the prior Japanese Patent Application No. 2005-317632 filed on Oct. 31, 2005, the entire contents of which are incorporated herein by reference.

BACKGROUND OF THE INVENTION

1. Field of the Invention

The present invention relates to a moving picture encoder, and more specifically to the detection of a scene change in the preprocess of an encoding process, the control of the amount-of-information allocation, and the control of the initialization of a rate control parameter related to the detection.

2. Description of the Related Art

Recently, with the progress of encoding technology, etc., it has become widespread to process image data as digital data, store the data of a static image and a moving picture in an optical disk, a magnetic disk, etc. using a digital signal, and regenerate a high-quality image. In the transmission system, services of a digital television telephone and a digital broadcast have been started. Thus, since the amount of image data is considerably large to process image data as digital data, it is necessary to efficiently encode and compress the image data.

FIG. 1 shows the rough concept of the moving picture encoder for encoding a moving picture. The moving picture encoder is provided with an encoding unit 300 for practically encoding a moving picture, and a preprocessing unit 200 for extracting information for use in encoding an original image by an encoding unit 300 before the encoding process.

In encoding a moving picture, the amount of coding information for each frame is compressed not only based on the correlation between pixels in a frame, but also based on the correlation between frames. For example, as shown in FIG. 2, each frame of an original image is classified into an I frame (key frame, I picture) which is an absolute standard of the difference between frames, a P frame (predictive-coded frame, P picture) whose difference from the previous frame is encoded, and a B frame (bi-directionally predictive-coded frame, B picture) for encode based on the pixel information about the frames in two directions, that is, the previous and subsequent frames. In the example shown in FIG. 2, a group of pictures (GOP) is formed by 12 frames. The preprocessing unit 200 determines the picture types of I, P, and B.

Also in encoding an original image, it is known that when a scene change occurs, it is detected and the leading frame of the subsequent scene is defined as an I frame, that is, an I frame is inserted. This means that there is an important correlation between the frames in one scene while there is a less important correlation when a scene changes, and the amount of data required in the coding does not greatly change between encoding a difference from the previous frame and encoding as a single frame, or the difference cannot be sufficiently encoded, thereby degrading the quality of an image. As described above, if an I frame is inserted when a scene change occurs, then the occurrence of the scene change is also detected by the preprocessing unit 200.

In encoding of moving pictures, I-frame is inserted when a scene change occurs. If scene changes frequently occur in the range of a predetermined amount-of-information allocation, the amount of information allocated to an encoding process on I-frame becomes enlarged. Therefore, the amount of information cannot be sufficiently reserved for another coding, thereby considerably degrading the quality of an image. Thus it is necessary to prevent the degradation of the quality of an image although scene changes frequently occur.

The patent documents 1 and 2 listed below describe the technology of detecting a scene change. The patent document 1 describes the technology of detecting a change of a scene in order to edit a moving picture recorded on a video tape. The patent document 2 describes the technology of determining the moving picture characteristic common to a frame group having the same scene, and collectively amending an image based on the determined characteristic.

The patent documents 3 and 4 describe an image obtained by performing pull-down transformation on a film of movies and a related encoding process, and also describe the scene change detection. Furthermore, the patent document 4 describes the bit allocation for use in an encoding process.

FIG. 3 shows an example of misdetection of a scene change when a scene change detecting process is performed based on an amount of time change of a summation of absolute differences (SAD) between frames which use the same data in a plurality of frames in performing a process of animation, pull-down, edit, etc. When there is a static image screen, the amount of time change of SAD is large although a scene change does not occur, and there is the possibility of misdetection of a scene change.

When the same data is also used in the processes of animation, pull-down, edit, etc. (when the time axis is not even), there is the possibility of an occurrence of misdetection of a scene change. So, it is necessary to prevent the misdetection of a scene change.

Briefly described below is amount-of-information allocation for encoding and rate control performed in encoding a moving picture. To monitor and control the amount of information required in encoding a moving picture, it is assumed that encoded data is input to a virtual VBV (video buffering verifier) buffer. The VBV is a virtual decoder conceptually connected to the output of an encoder. The encoder has to output a bit stream, preventing the overflow or underflow of the VBV. The required range of the VBV for a generated amount of information depends on each encoding standard.

FIG. 4 shows an example of a change with time of an amount of occupation of a VBV buffer indicating the occupation of the VBV buffer when the next frame is encoded. Therefore, since VBVmax refers to a maximum available buffer, it means that the buffer is available, and "0" means that there is no available space in the buffer.

The amount of occupation of the VBV buffer, that is, the remainder in the VBV buffer, is considered for the amount-of-information allocation for encoding and the rate control. The amount of encoding information is allocated for each GOP, and the amount of information is allocated to the frame in the GOP in the range of the allocation.

[Patent Document 1] Japanese Published Patent Application No. H09-130732

[Patent Document 2] Japanese Published Patent Application No. 2002-152669

[Patent Document 3] Japanese Published Patent Application No. H10-145779

[Patent Document 4] Japanese Published Patent Application No. H10-304379

SUMMARY OF THE INVENTION

According to the first aspect of the present invention, a scene change detection threshold is obtained depending on the remainder in the VBV buffer, the scene change detection threshold is compared with a scene change detection value for determination of the occurrence of a scene change, and it is determined whether or not a scene change has occurred based on the comparison result. The scene change detection value can be the amount of time change of the summation of absolute differences between original image frames. By evaluating the size of the summation of absolute differences, it may not be determined that a scene change has occurred.

According to the second aspect of the present invention, when the scene change detection is canceled depending on the remainder in the VBV buffer, the GOP allocated amount of information is added, and/or the rate control parameter is initialized.

Furthermore, according to the third aspect of the present invention, the rate control parameter is dynamically initialized depending on the summation of absolute differences between the frame corresponding to a scene change and the subsequent frame. Therefore, for each occurrence of a scene change, or for each GOP, the rate control parameter at the time is registered in the database using the moving average of the summation of absolute differences between frames as an index, the database is referenced using the summation of absolute differences between the frame corresponding to the scene change and the subsequent frame when a scene change occurs, the rate control parameter of the corresponding index is read, and the value obtained from the read rate control parameter and the initial value of the rate control parameter set as a predetermined value is defined as an initial value of the rate control parameter.

According to the present invention, since the detection can be canceled depending on the available capacity of the VBV buffer although scene changes frequently occur, the amount of information used in encoding I-frame is not excessively large, thereby preventing the degradation of the quality of an image. Although there is a static image screen, the misdetection of a scene change can be avoided.

Furthermore, according to the present invention, although scene change detection is canceled, an encoding process after the cancellation can be appropriately performed by adding the GOP allocated amount of information and/or initializing the rate control parameter.

Additionally, according to the present invention, the convergence of a rate parameter after a scene change can be speeded up, and the stable quality of an image can be provided after a scene change.

BRIEF DESCRIPTION OF THE DRAWINGS

FIG. 5 shows the principle and the first aspect of the present invention;

FIG. 9 shows an aspect of preventing misdetection of a scene change according to the first embodiment for preventing misdetection of a scene change;

DESCRIPTION OF THE PREFERRED EMBODIMENTS

FIG. 5 shows the principle and the first aspect of the present invention. The first aspect of the present invention is explained below by referring to FIGS. 5 through 10. As shown in FIG. 5, a scene change detection value arithmetic unit 10 calculates a scene change detection value for evaluation of the scene change detection from the frames of original image, and a threshold arithmetic unit 20 calculates a scene change detection threshold based on the remainder in the VBV buffer. A scene change determination unit 30 compares the scene change detection value with the scene change detection threshold, and determines depending on the comparison result whether or not a scene change has occurred.

A scene change detection threshold can be calculated by, for example, the following equation.

Scene Change Detection Threshold=Number Of Picture Pixels×Constant×(VBV Buffer Maximum Value÷Amount Of Occupation In VBV Buffer)

As explained above, the amount of occupation in the VBV buffer refers to the remainder in the VBV buffer as an amount of occupation in the VBV buffer when a frame is being encoded. A constant is selected as a value with which a scene change is not incorrectly detected when the amount of occupation in the VBV buffer is equal to the maximum value of the VBV buffer, that is, the scene change detection threshold is equal to its minimum value.

Then, the threshold arithmetic unit 20 outputs a larger value of a scene change detection threshold when the remainder in the VBV buffer becomes small. Therefore, although a scene change has practically occurred, the scene change detection is canceled, and the moving picture encoder does not perform usual operation at the time of scene change occurrence. Therefore, when the remainder in the VBV buffer is small, the insertion of an I-frame having a large amount of generated information can be avoided.

Figure 6:
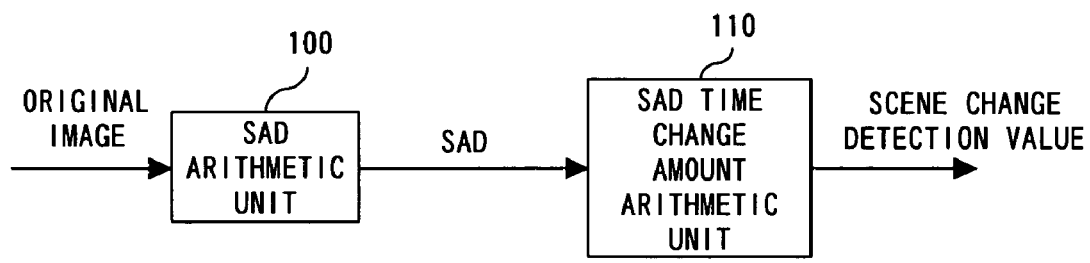
FIG. 6 shows an example of the configuration of the block diagram showing the function of the scene change detection value arithmetic unit shown in FIG. 5.

FIG. 6 shows an example of the configuration of the block diagram showing the function of the scene change detection value arithmetic unit 10 shown in FIG. 5. In the example shown in FIG. 6, the scene change detection value arithmetic unit 10 comprises an SAD arithmetic unit 100 for obtaining a summation of absolute differences (SAD) of each pixel between original image frames, and an SAD time change amount arithmetic unit 110 for calculating the amount of time change, and the amount of time change of the summation of absolute differences of each pixel between the original image frames is defined as a scene change detection value.

Figure 7:
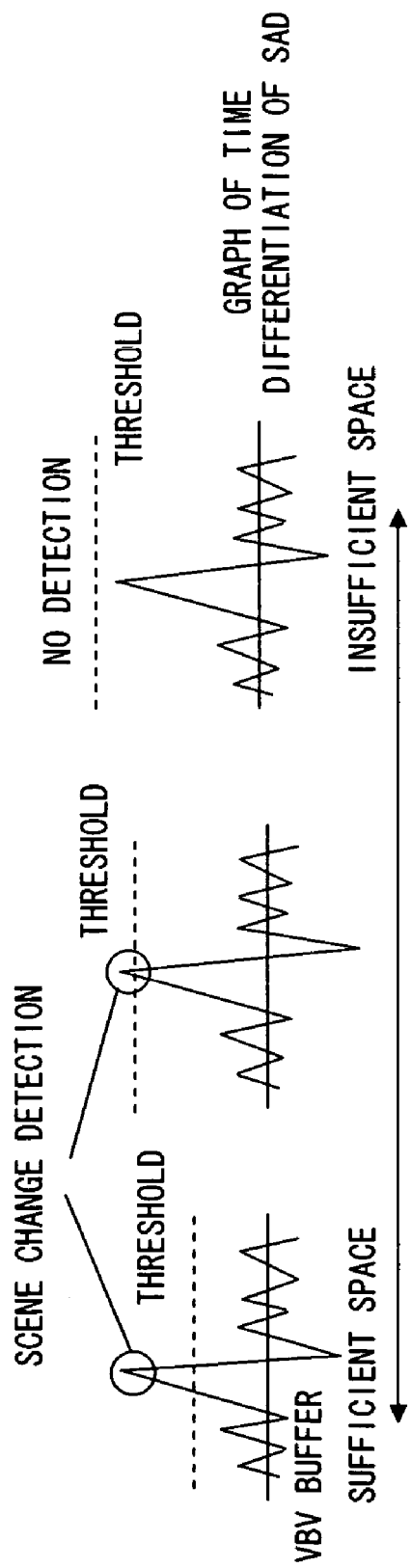
FIG. 7 shows an aspect of scene change detection according to the present invention.

FIG. 7 explains an aspect of scene change detection according to the present invention. FIG. 7 shows a graph of time differentiation of a summation of absolute differences (SAD) as a scene change detection value and a graph of a scene change detection threshold in the case where there is a sufficient remainder in the VBV buffer and in the case where there is a small remainder in the VBV buffer. When there is a small remainder in the VBV buffer, no scene change is detected.

Figure 8:
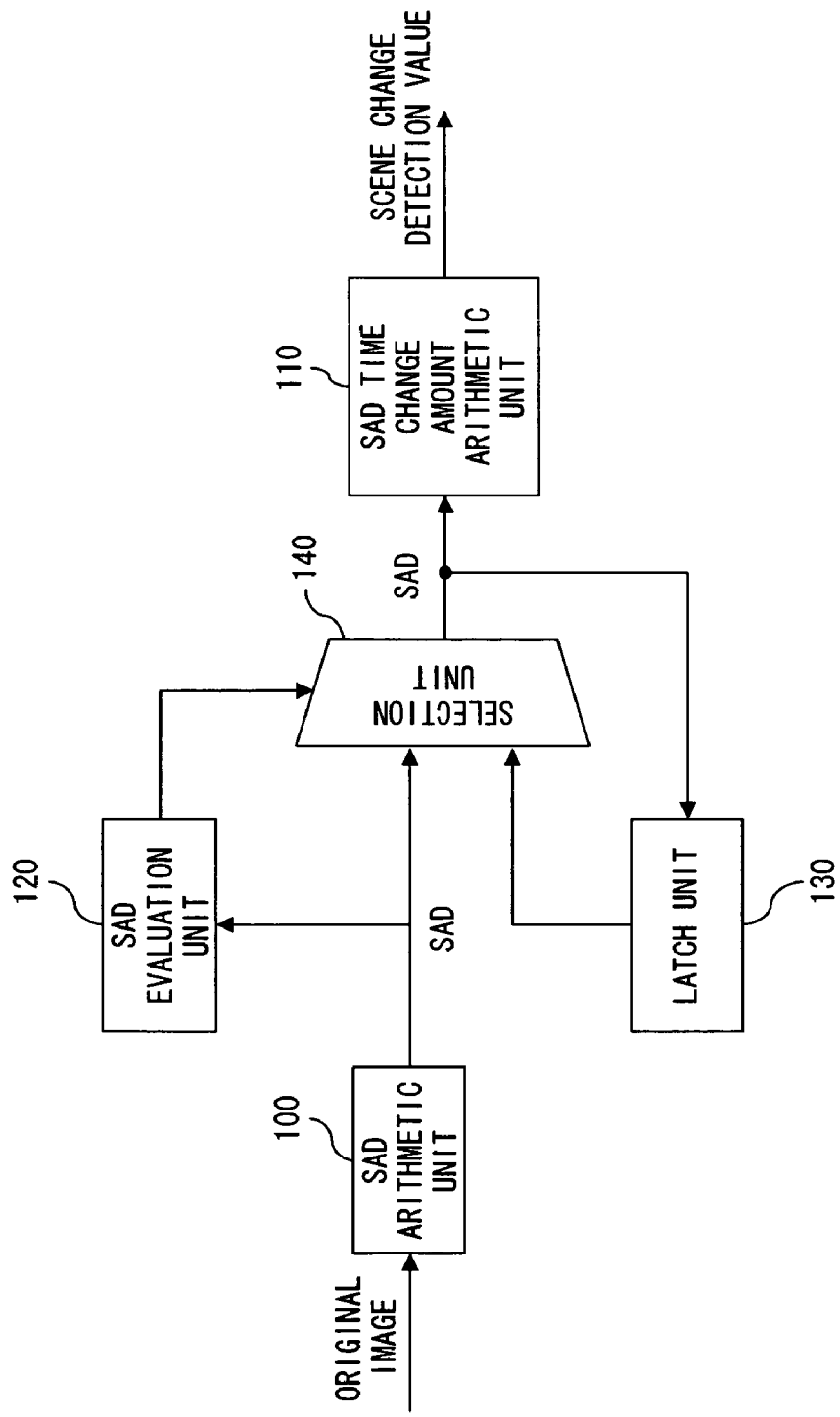
FIG. 8 is an explanatory view of the first embodiment for preventing misdetection of a scene change.
Figure 10:
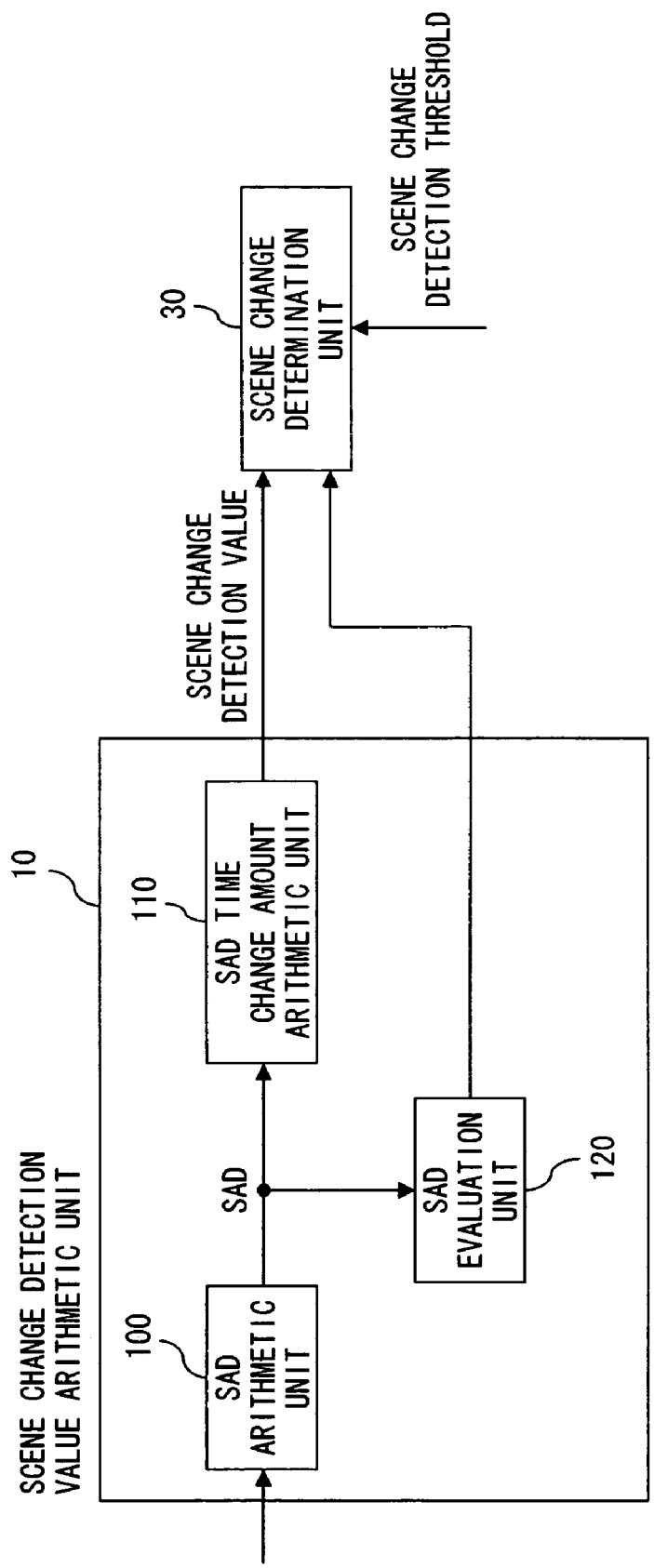
FIG. 10 is an explanatory view of the second embodiment for preventing misdetection of a scene change.

Next, FIGS. 8 through 10 show an embodiment of preventing misdetection of a scene change occurring from a static image screen, etc. in the image frame strings. In the embodiment, the size of the summation of absolute differences between frames is evaluated, and no scene change detection determination is made when the summation of absolute differences is smaller than a predetermined threshold.

The embodiment shown in FIG. 8 prevents misdetection of a scene change by suppressing the update of the value of summation of absolute differences for use in the calculation by the SAD time change amount arithmetic unit 110 if the summation of absolute differences is smaller than a predetermined threshold. Therefore, a function block of a SAD evaluation unit 120, etc. for comparing a summation of absolute differences between frames with a predetermined threshold and evaluating the size is added to the SAD arithmetic unit 100 and the SAD time change amount arithmetic unit 110 as function blocks of the scene change detection value arithmetic unit 10 shown in FIG. 6. A latch unit 130 inputs output of a selection unit 140 before one frame to the selection unit 140. Depending on the evaluation result of the SAD evaluation unit 120, the selection unit 140 selects the input from the latch unit 130 when the summation of absolute differences calculated by the SAD arithmetic unit 100 is smaller than a predetermined threshold, selects the summation of absolute differences when the summation of absolute differences is equal to or larger than the predetermined threshold, and inputs the selected value to the SAD time change amount arithmetic unit 110.

Figure 1:
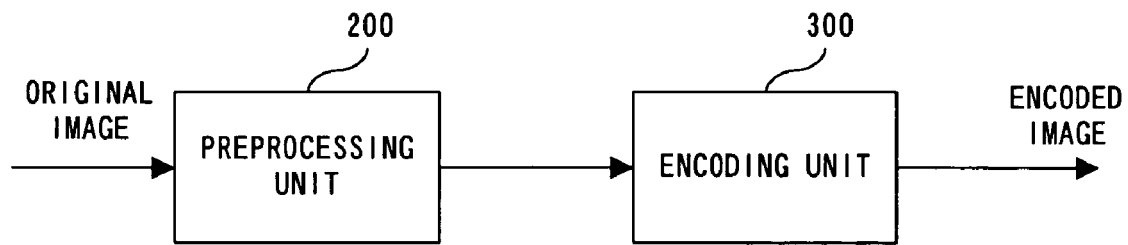
FIG. 1 shows a rough concept of the moving picture encoder.
Figure 2:
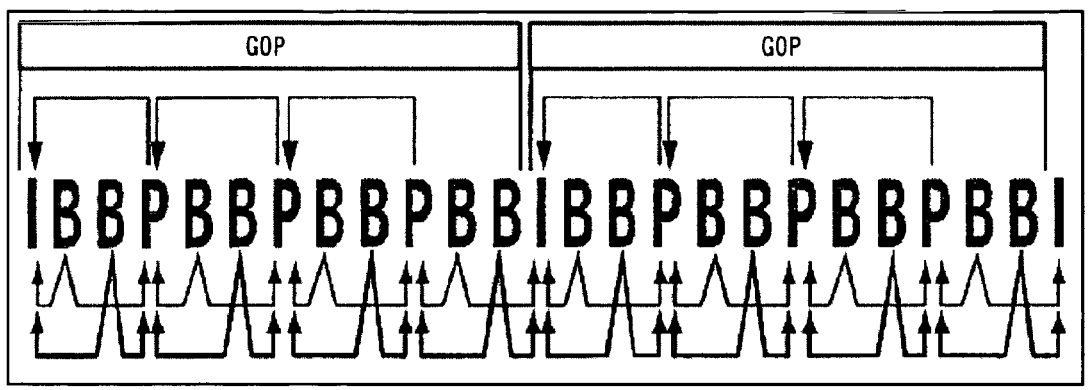
FIG. 2 shows an example of the configuration of a GOP.
Figure 3:
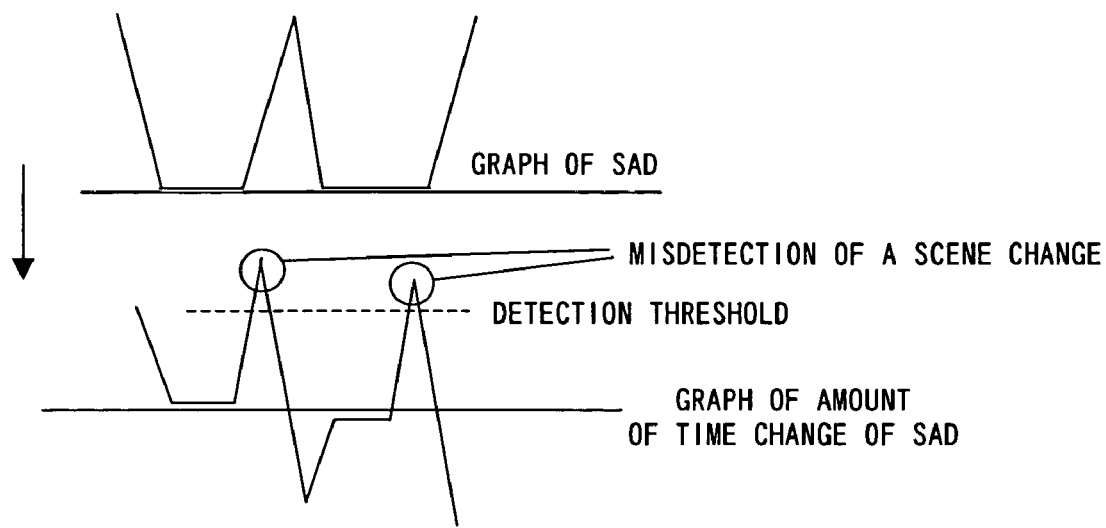
FIG. 3 is an explanatory view of the occurrence of misdetection of a scene change.
Figure 4:
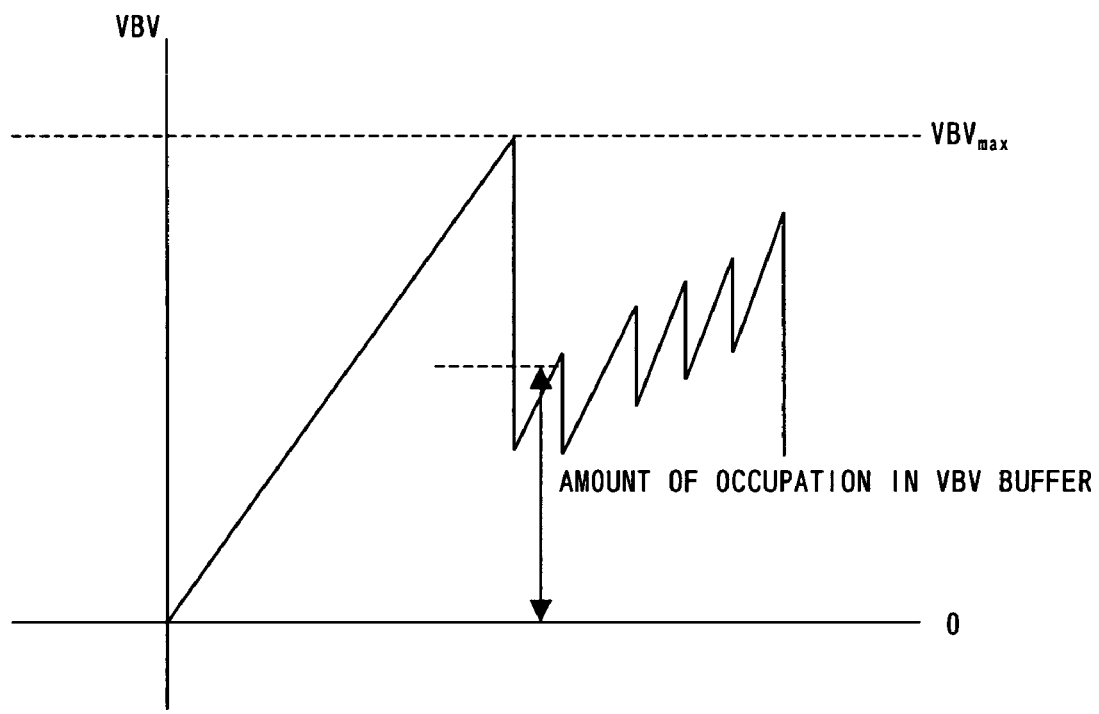
FIG. 4 shows a change with time of an amount of occupation in the VBV buffer.

FIG. 9 shows the aspect of preventing the misdetection of a scene change in the embodiment shown in FIG. 8. When an original image including a static image screen similar to what is shown in FIG. 3 is input, the summation of absolute differences is smaller than a predetermined threshold in the portion of the static image screen. Then, the summation of absolute differences is not updated, and the graph of the summation of absolute differences input to the SAD time change amount arithmetic unit 110 is a solid line shown in FIG. 9. Therefore, since a change with time of the summation of absolute differences is not so large, the scene change determination unit 30 does not incorrectly detect a scene change.

FIG. 10 is a block diagram of the function according to the embodiment in which when the summation of absolute differences is smaller than a predetermined threshold, the scene change determination unit 30 does not determine that a scene change has occurred instead of the embodiment shown in FIG. 8 in which the SAD time change amount arithmetic unit 110 does not update the value of the summation of absolute differences for use in the calculation. Although the scene change detection value arithmetic unit 10 is provided with the SAD evaluation unit 120 for comparing the summation of absolute differences between frames with a predetermined threshold and evaluating the size as in the embodiment shown in FIG. 8, the output is supplied to the scene change determination unit 30. When the scene change determination unit 30 is notified by the SAD evaluation unit 120 that the summation of absolute differences is smaller than the predetermined threshold, the scene change determination unit 30 does not determine that a scene change has occurred regardless of the comparison result between the scene change detection value and the scene change detection threshold.

From the characteristic of a practical moving picture, the suppression of the determination of a scene change to avoid misdetection is to be performed on three frames only, and it is preferable that the upper limit of the number of frames on which the determination that a scene change has occurred is not performed is three.

The method of avoiding misdetection of a scene change is explained by referring to the embodiment according to the first aspect of the present invention, but the method of avoiding misdetection of a scene change can also be used when the scene change detection threshold is not dynamically changed as a fixed value.

Figure 11:
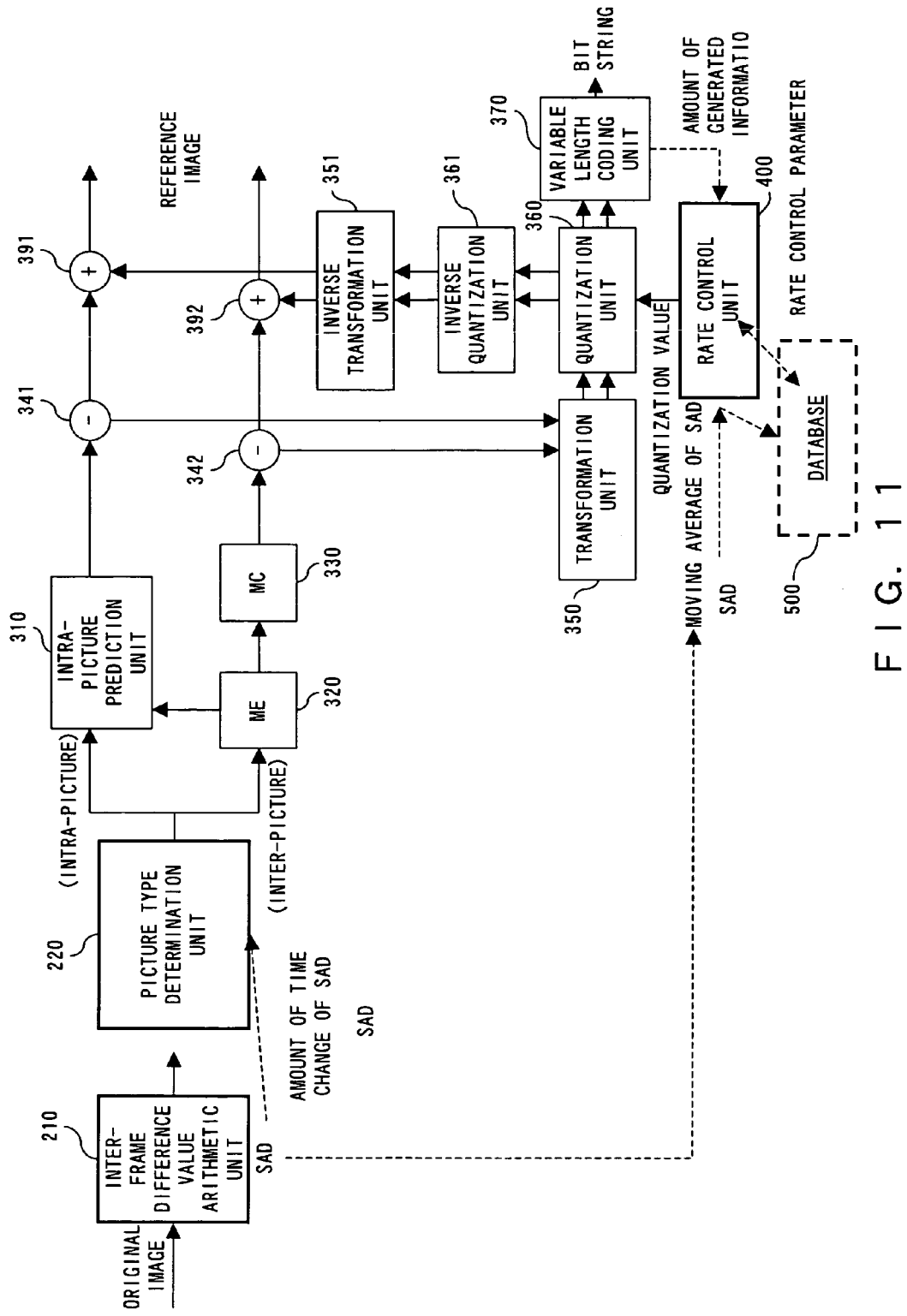
FIG. 11 shows an example of the configuration of the block diagram showing the function of the moving picture encoder to which the present invention is applied.

An example of the configuration of the block diagram of the function of the moving picture encoder to which the present invention is applied is explained below by referring to FIG. 11. The arrow in the solid lines shown in FIG. 11 shows the flow of the process and/or the flow of data, and the arrow in the dotted lines shows the flow of data. The flow of data of the original image frame to be compared and used in the calculation of an inter-frame difference value, etc. is omitted to simplify the drawings.

In the moving picture encoder shown in FIG. 11, an inter-frame difference value arithmetic unit 210 first calculates a difference value between input original image frames. The inter-frame difference value arithmetic unit 210 can be the same as the SAD arithmetic unit 100 shown in FIG. 6, but in addition to the function of the SAD arithmetic unit 100, the inter-frame difference value arithmetic unit 210 can calculate the SAD amount of time change for use in the determination of a scene change, a moving average value of the SAD for use in the rate control in the embodiment described later, etc.

A picture type determination unit 220 determines a picture type during a normal operation, determines a scene change, and determines a picture type when a scene change is occurred. If it is determined that intra-picture encoding is performed, that is, an input original image frame is encoded as an I-frame, then, in the moving picture encoder corresponding to H.264, for example, an intra-picture prediction unit 310 performs a predicting process between macro-blocks obtained by dividing one frame by 16×16 pixels each etc. At this time, the already processed macro-block data is used. If it is determined that the intra-picture encoding is performed, that is, an input original image frame is encoded as a P-frame or a B-frame, a motion estimation unit ME 320 detects a motion vector in a macro-block unit.

The motion vector detected by the motion estimation unit ME 320 is provided for a motion compensation unit MC 330, and is used in the predicting process by the motion compensation unit MC 330.

The data of the intra-picture and inter-picture on which the predicting process has been performed is used in calculating a prediction error by difference arithmetic units 341 and 342, provided for a transformation unit 350, and further provided for addition units 391 and 392 to reconstruct a reference image.

The transformation unit 350 converts space information about a prediction error to frequency information. In this process, a DCT (MPEG-4, etc.) or an integer transformation (H.264) is performed in the encoding system, and a transform coefficient is provided for a quantization unit 360.

The quantization unit 360 performs quantization on a transform coefficient based on a quantization value received from a rate control unit 400. The quantized coefficient is provided for a variable length coding unit 370, and provided also for an inverse quantization unit 361.

The variable length coding unit 370 encodes a quantized coefficient, outputs final encoded data as a bit string, and feeds back the amount of generated information after the encoding process to the rate control unit 400.

The inverse quantization unit 361 performs inverse quantization on the quantized coefficient and reconstructs a transform coefficient, and am inverse transformation unit 351 performs inverse transformation on the transform coefficient, and provides error information about a prediction error for the addition units 391 and 392.

The addition units 391 and 392 reconstruct a reference image from the prediction data and the prediction error data.

The rate control unit 400 updates the rate control parameter based on the amount of generated information fed back from the variable length coding unit 370, and controls the quantization value to be provided for the quantization unit 360. The initialization of the rate control parameter using a database 500 is described later in detail.

Next, the second aspect of the present invention is explained below. In the second aspect of the present invention, the segmentation of a GOP (insertion of I-frame) is not performed when scene change detection is canceled although a scene change is practically occurs. However, the operations to be performed when a GOP is segmented, for example, adding the amount of information allocated to a GOP, initializing a rate control parameter, etc. are performed. That is, the second aspect is a sub-aspect of the first aspect.

Figure 12:
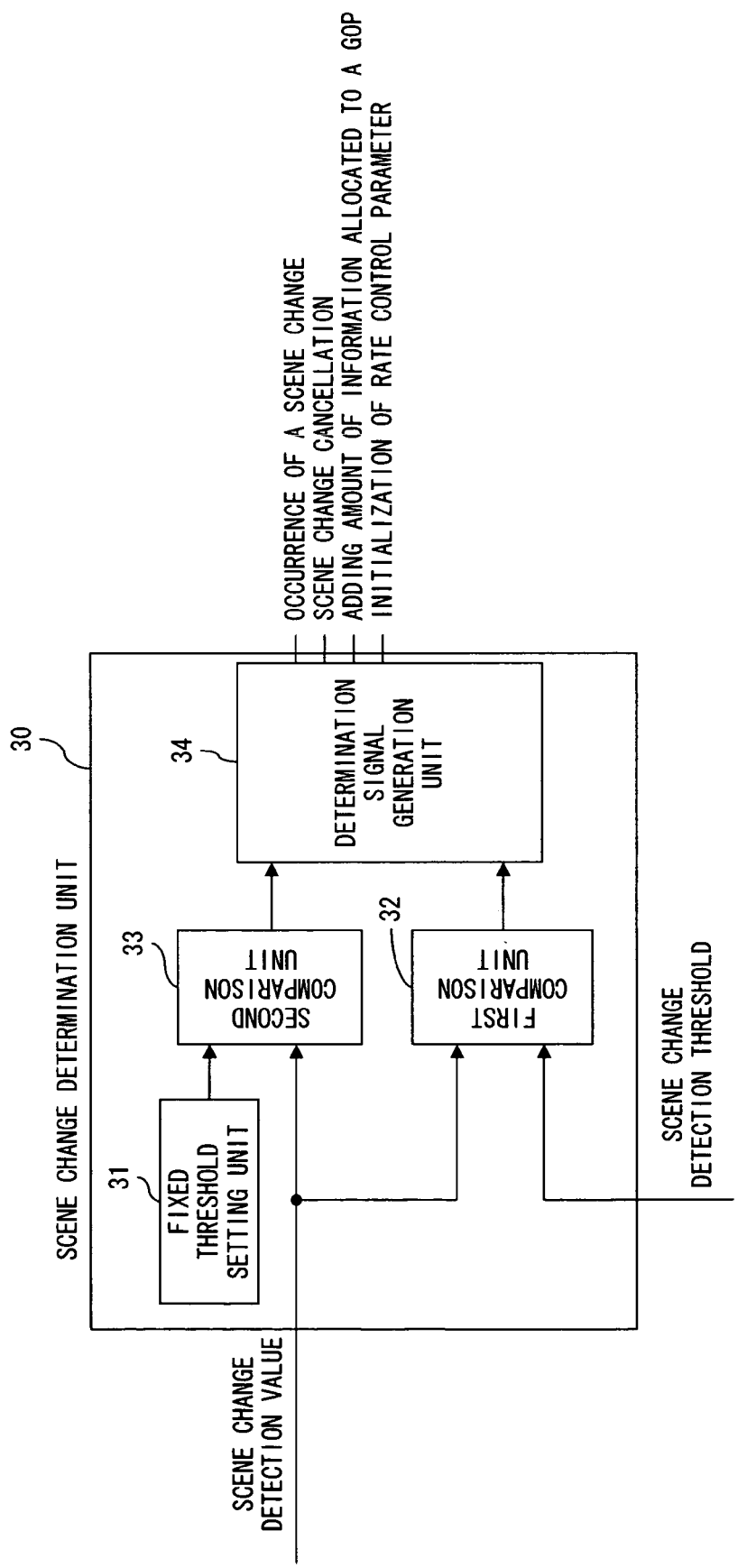
FIG. 12 is an explanatory view of the second aspect of the present invention.

FIG. 12 shows an embodiment of the scene change determination unit 30 embodying the second aspect of the present invention. It is preferable that a fixed threshold set in a fixed threshold setting unit 31 is equal to or smaller than the minimum value of the scene change detection threshold, and can be, for example, the number of pixels*constant by the equation of the above-mentioned scene change detection threshold.

When it is determined from the output of a first comparison unit 32 and a second comparison unit 33 that a scene change detection value is between a fixed threshold and a scene change detection threshold, a determination signal generation unit 34 outputs a signal for notification of scene change cancellation and a signal indicating addition of an amount of information allocated to a GOP or a signal indicating the initialization of a rate control parameter. Relating to the addition of an amount of information allocated to a GOP, its upper limit should be an average allocated information amount for one frame.

Both or one of the signal indicating addition of an amount of information allocated to a GOP and the signal indicating the initialization of a rate control parameter can be output. Transmitting the signal indicating addition of an amount of information allocated to a GOP and the signal indicating the initialization of a rate control parameter from the scene change determination unit 30 can be replaced with adding an amount of information allocated to a GOP or initializing a rate control parameter by a receiver of a scene change cancellation signal upon receipt of a scene change cancellation signal.

Explained below is the third aspect of the present invention in which a rate control parameter is dynamically initialized depending on the summation of absolute differences between the frame related to a scene change and the subsequent frame.

In the real-time processing in which a multi-path cannot be used in an encoding process, since the characteristic of a scene after a scene change cannot be known, a fixedly determined initial value has to be used when a rate control parameter is initialized after a scene change. Then, it takes a long time for a rate control parameter to converge to the optimum value, and it is necessary to generate information that is not normally required, which is disadvantageous in the generating amount of information. Thus, it is desirable to prevent unstable quality of image after a scene change.

Moving pictures often show similar scenes and repeatedly appear. In these cases, it is insignificant to set a rate control parameter as an initial value for each scene change, and start a quantizing process using an initial value. Therefore, considering that a rate control parameter can converge sooner if the previously used rate control parameter can be used, the third aspect of the present invention has been devised.

The third aspect of the present invention is explained below in detail by referring to FIGS. 13 through 15C. The third aspect of the present invention can be embodied as a sub-aspect of the first or second aspect of the present invention as understood according to the explanation above. However, it can also be embodied as an independent aspect.

Figure 13:
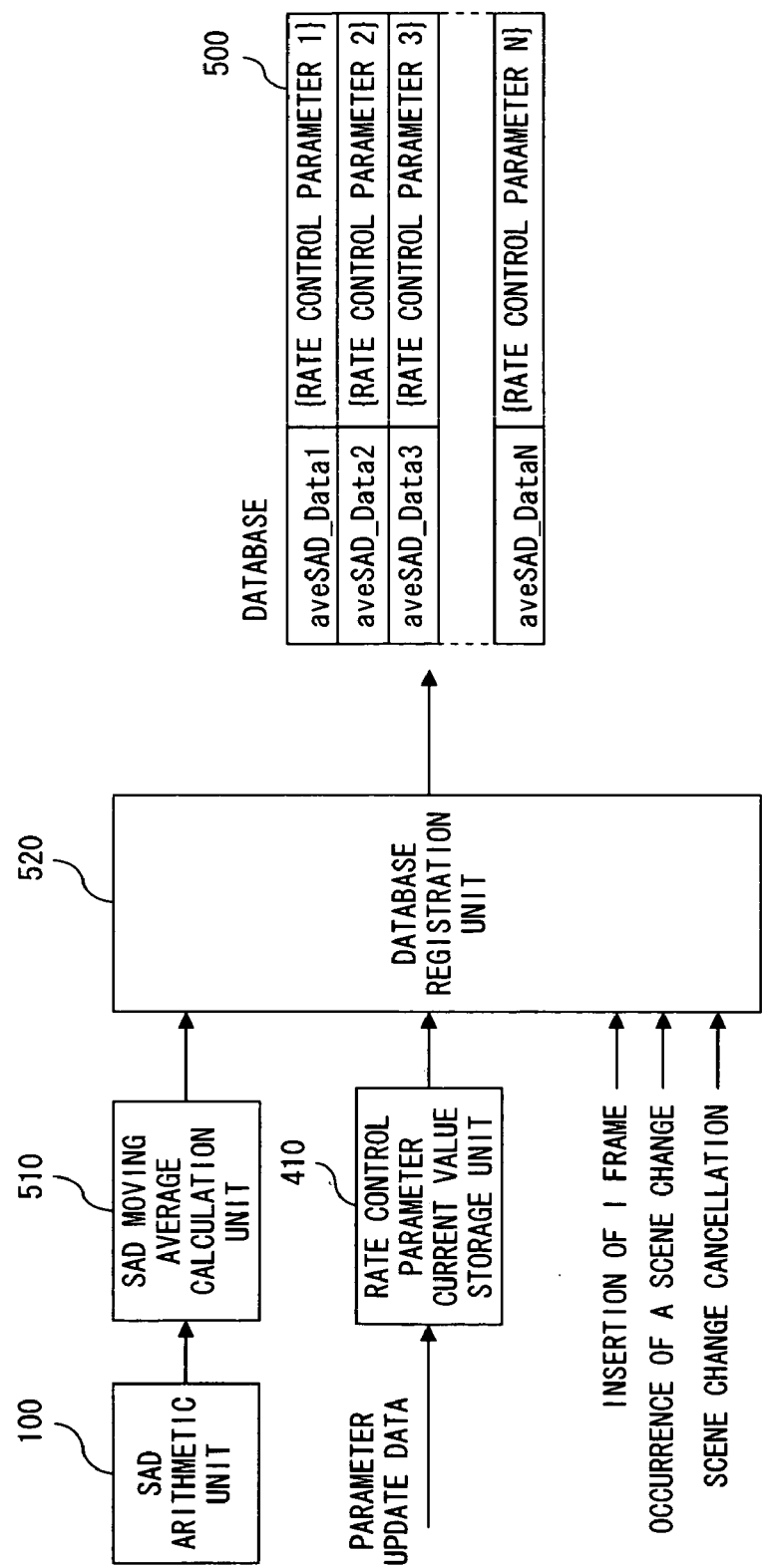
FIG. 13 shows an example of the configuration of the block diagram of the function embodying the database registering process according to the third aspect of the present invention.
Figure 15A:
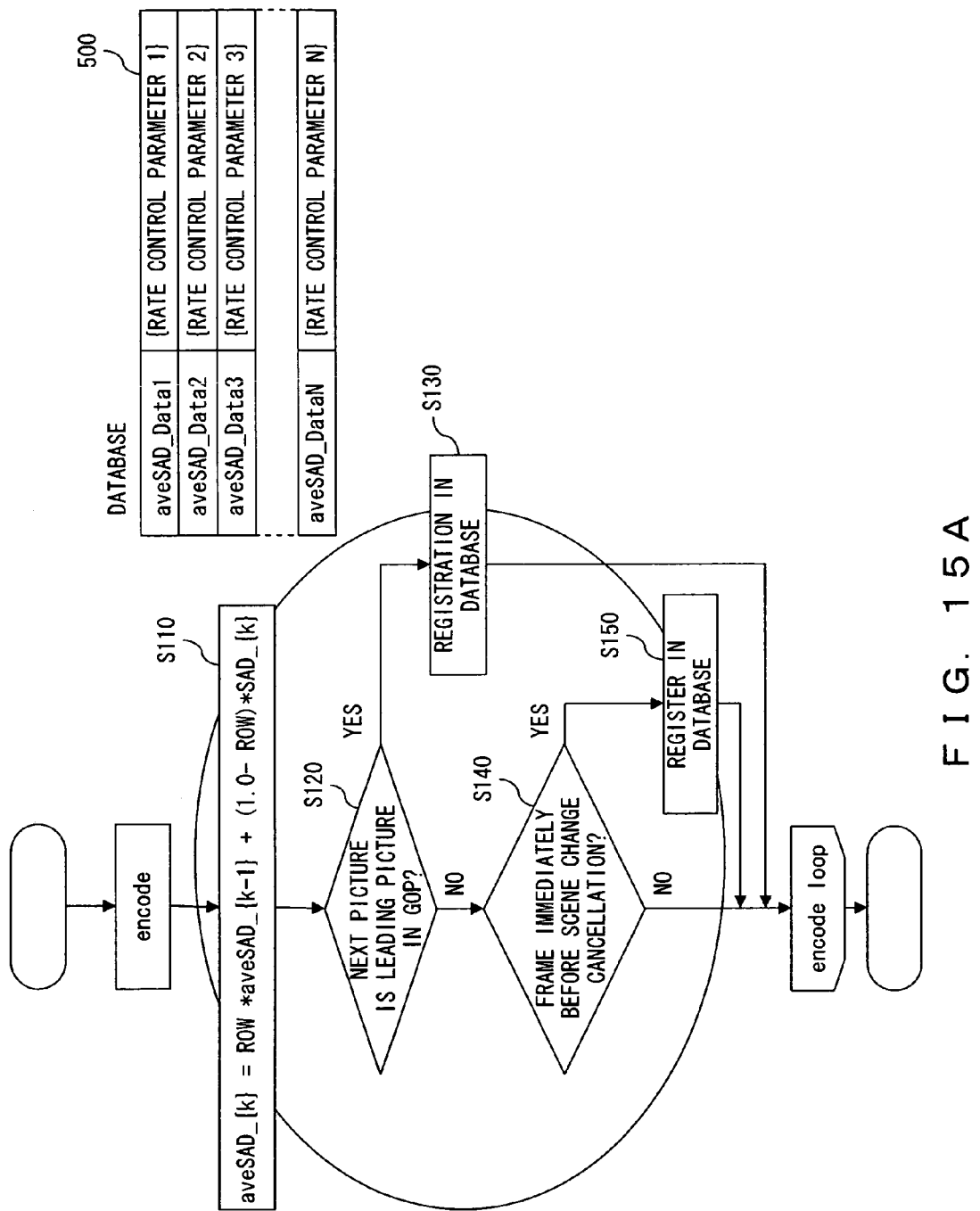
FIG. 15A is a flowchart of the database registration for each GOP according to the third aspect of the present invention.
Figure 15B:
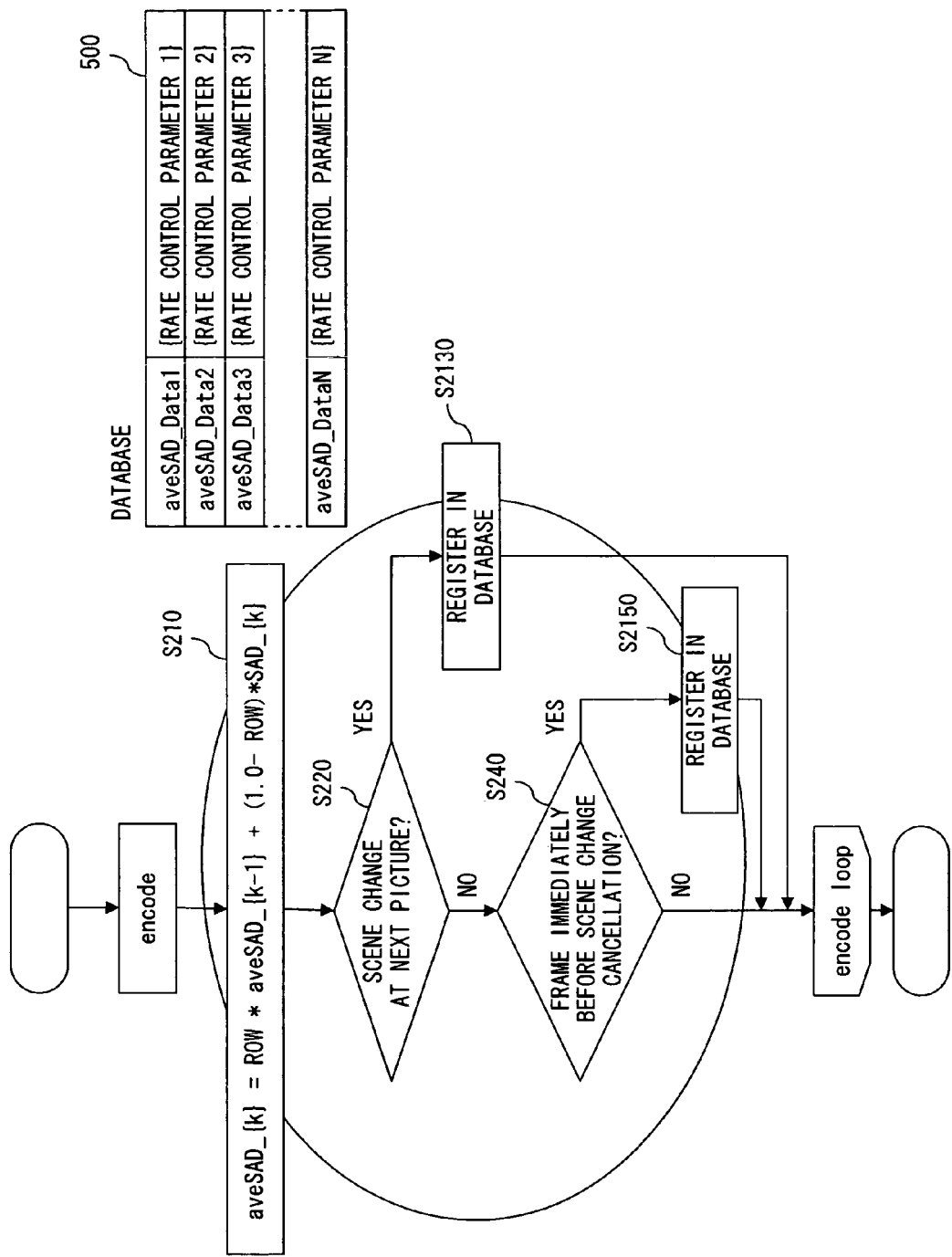
FIG. 15B is a flowchart of the database registration for each scene change according to the third aspect of the present invention.

First, the process of registering a candidate for the initial value of the rate control parameter in a database is explained below by referring to FIGS. 13, 15A, and 15B. FIG. 13 shows an example of the configuration of the block diagram of the function embodying the database registration process according to the third aspect of the present invention. FIG. 15A is a flowchart of registration in a database for each GOP, and FIG. 15B is a flowchart of registration in a database for each scene change. For each case, an option of registering in a database when scene change detection is canceled is described.

An SAD moving average calculation unit 510 calculates a moving average of a SAD sequentially calculated by the SAD arithmetic unit 100 by the following equation described in step S110 of the flowchart shown in FIG. 11A, and in step S210 of the flowchart shown in FIG. 11B, $$aveSAD\_\{k\}=ROW*aveSAD\_\{k-1\}+(1.0-ROW)*SAD\_\{k\},$$

where ROW indicates the weight of the moving average, and the closer to 1 the value is, the more moderate the transition of aveSAD becomes. In this example, 0.9, 0.99, etc. can be used.

A rate control parameter current value storage unit 410 refers to a storage function block portion storing a rate control parameter practically used for rate control. A rate control parameter in this case is updated to the optimum value by feedback of a result of an encoding process.

A database registration unit 520 performs database registration by the trigger of I-frame insertion, occurrence of a scene change, and scene change cancellation.

For example, when database registration is performed for each GOP, by the trigger of the I-frame insertion notified, for example, by the picture type determination unit 220 shown in FIG. 11, the moving average up to the frame immediately before, and the rate control parameter stored in the rate control parameter current value storage unit 410 are registered in the database 500 using the moving average as an index. The aveSAD_DATA1, {rate control parameter}, etc. described in the database 500 shown in FIG. 13 show the thus registered moving average and rate control parameter. The above-mentioned registering process corresponds to the steps S120 through S130 in the flowchart shown in FIG. 15A. The steps in S140 and S150 shown in FIG. 15A are the steps in the flow performing the database registration when scene change cancellation is occurred, so they can be omitted. The database 500 can be cyclically used as a FIFO having a finite number of indexes.

The flowchart shown in FIG. 15B is the same as the flowchart shown in FIG. 15A except that the database registration is performed by the trigger of a scene change.

Figure 14:
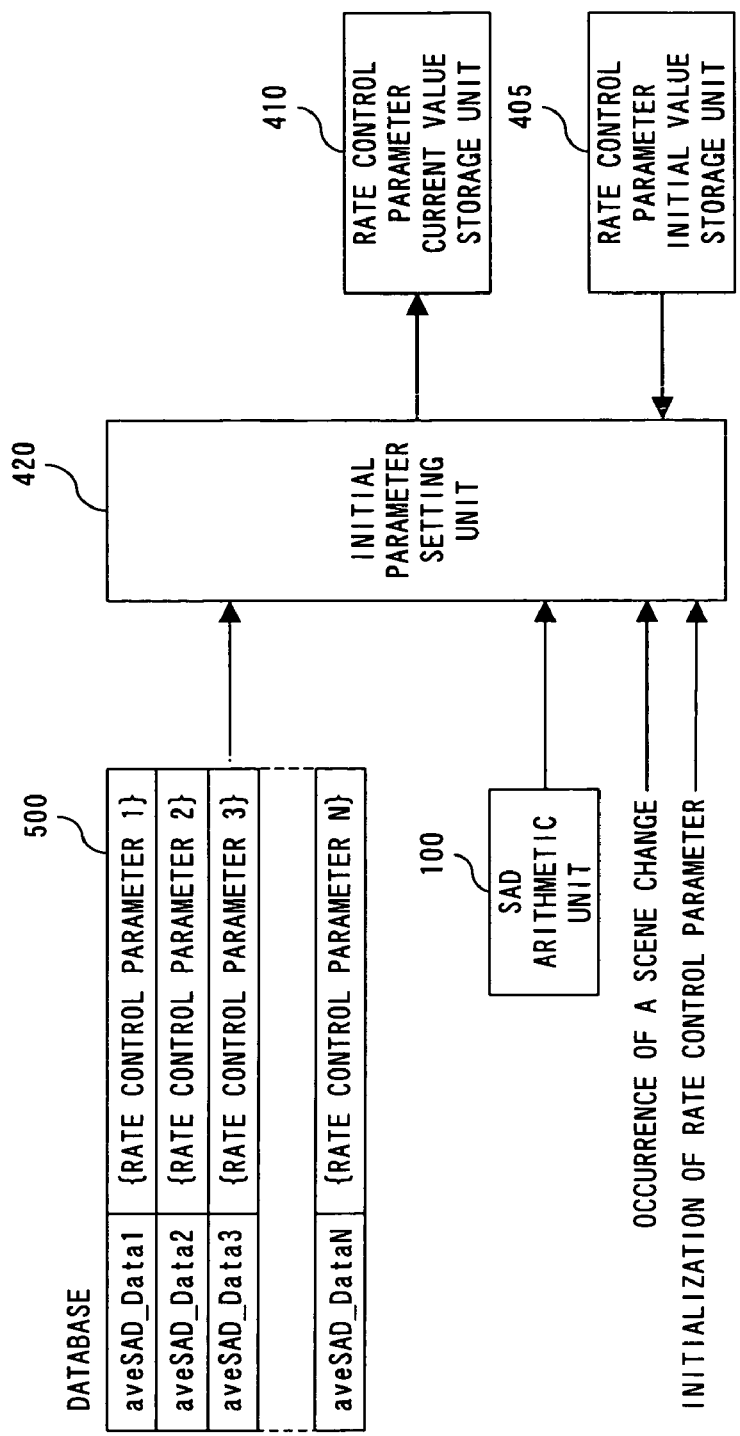
FIG. 14 shows an example of the configuration of the block diagram showing the function embodying the initialization of the rate control parameter by referring to the database according to the third aspect of the present invention.
Figure 15C:
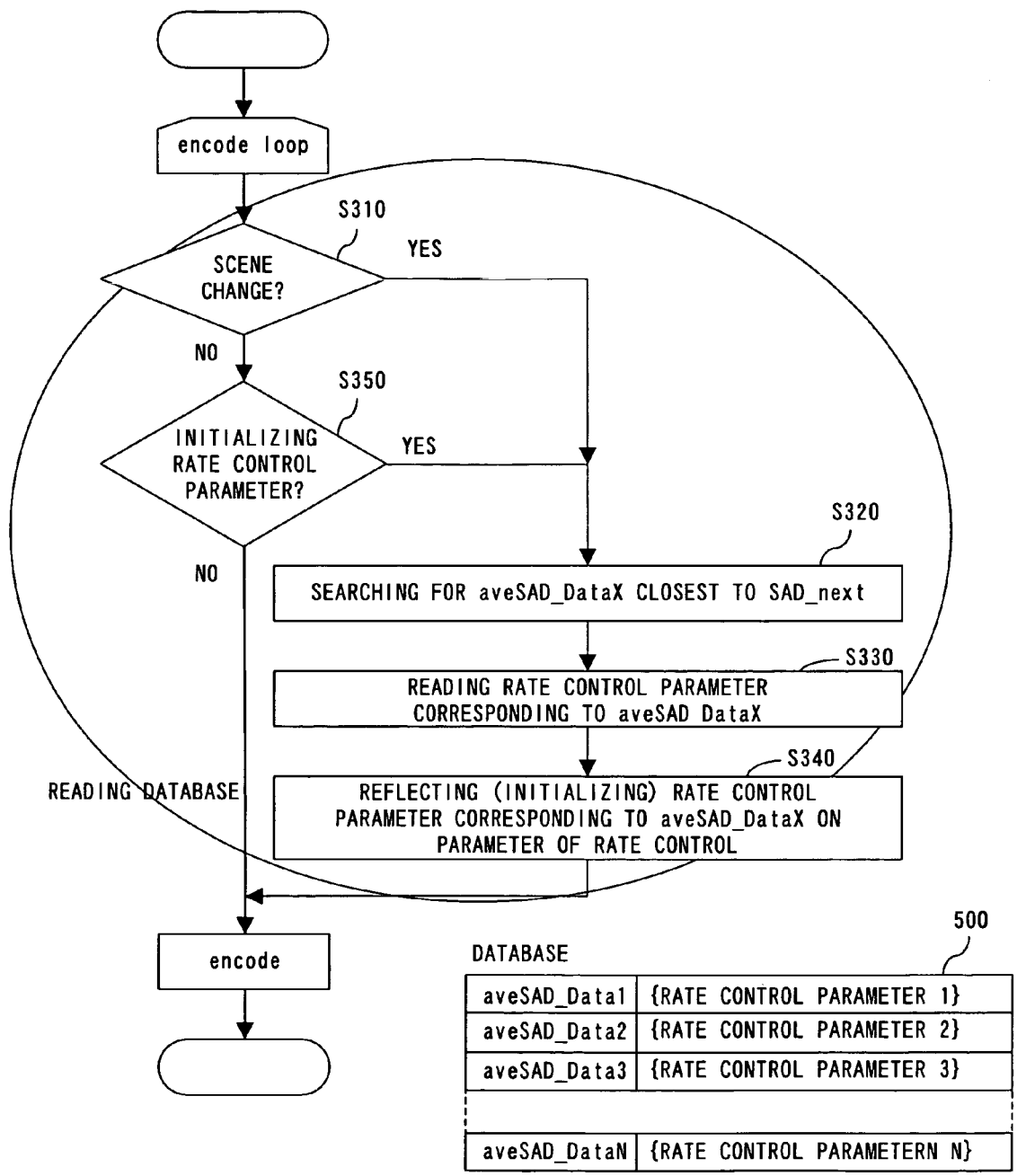
FIG. 15C is a flowchart embodying the initialization of the rate control parameter by referring to the database according to the third aspect of the present invention.

The initialization of a rate control parameter using the database 500 is explained by referring to FIGS. 14 and 15C. FIG. 14 shows an example of the configuration of the block diagram of the function embodying the initialization of the rate control parameter by referring to the database according to the third aspect of the present invention, and FIG. 15C shows the flow of the process.

An initial parameter setting unit 420 shown in FIG. 14 obtains, from the SAD arithmetic unit 100, the difference SAD_next between the frame relating to a scene change and the subsequent frame when the scene change occurs, that is, when the process in step S310 shown in FIG. 15C indicates YES. Then, as shown in steps S320 and S330 shown in FIG. 15C, aveSAD_DATAX closest to SAD_next is searched for, and the rate control parameter corresponding to aveSAD_DATAX is read. Then, by storing in the rate control parameter storage unit the intermediate value between the rate control parameter read from the database 500 and the initial value of the rate control parameter depending on each system of rate control and stored in a rate control parameter initial value storage unit 405, the rate control parameter corresponding to the aveSAD_DATAX in step S340 can be reflected (initialized) on the rate control parameter in the rate control unit 400. What range of a value is to be set between the rate control parameter read from the database 500 and the initial value of the rate control parameter read from the rate control parameter initial value storage unit 405 when the rate control parameter is initialized depends on the practical image data and the encoding system.

The process in step S350 shown in FIG. 15C is performed if an option of initializing the rate control parameter is selected when scene change is canceled according to the second aspect of the present invention shown in FIG. 12, and the subsequent processes are the same as those performed when a scene change occurs. In this case, SAD_next is the summation of absolute differences between the frame relating to the scene change cancellation and the subsequent frame.

As described above in detail, according to the present invention, although scene changes frequently occur, the detection of them can be canceled depending on the available capacity of the VBV buffer. Therefore, the amount of information used in encoding I-frame is not excessively large, thereby preventing the degradation of the quality of an image. Although there is a static image screen, misdetection of a scene change can be avoided.

Furthermore, according to the present invention, although scene change detection is canceled, amount of information allocated to a GOP can be added and/or a rate control parameter can be initialized, thereby appropriately performing the encoding process after the cancellation.

Also according to the present invention, a rate parameter can converge soon after a scene change, and the stable quality of an image can be provided even after a scene change.

Furthermore, in the block diagram of the functions explained above according to each aspect of the embodiments of the present invention, some functions can be realized by computer software in addition to hardware, and each block of the functions can be realized by an appropriate combination of hardware and software by those skilled in the art depending on the design condition.

Therefore, the embodiments of the present invention include a program used to direct a computer to function as a device embodying the present invention, and also a storage medium storing the program.

What is claimed is:

1. A moving picture encoder, comprising:
    a scene change detection value arithmetic unit calculating a scene change detection value from an original image;
    a threshold arithmetic unit calculating a scene change detection threshold depending on a remainder in a VBV buffer; and
    a scene change determination unit comparing the scene change detection threshold with a scene change detection value for determination of an occurrence of a scene change, and determining whether or not a scene change has occurred depending on a comparison result.

2. The moving picture encoder according to claim 1, wherein
    the detection threshold is calculated by number of picture pixels×constant×(maximum value of VBV buffer÷amount of occupation in VBV buffer).

3. The moving picture encoder according to claim 1, wherein
    the scene change detection value arithmetic unit comprises an SAD arithmetic unit for obtaining a summation of absolute differences between original image frames and an SAD time change amount arithmetic unit for obtaining an amount of time change in the summation of absolute differences, and the amount of time change in the summation of absolute differences is set as the scene change detection value.

4. The moving picture encoder according to claim 3, wherein
    the scene change detection value arithmetic unit comprises an SAD evaluation unit for evaluating whether or not the summation of absolute differences calculated by the SAD arithmetic unit is a value equal to or exceeding a predetermined threshold; and
    it is not determined whether or not a scene change has occurred when the summation of absolute differences is smaller than a predetermined threshold as a result of evaluation by the SAD evaluation unit.

5. The moving picture encoder according to claim 4, wherein
    when the summation of absolute differences is smaller than a predetermined threshold as a result of evaluation by the SAD evaluation unit, a value of summation of absolute differences for use in calculation by the SAD time change amount arithmetic unit is not updated, thereby making no determination that a scene change has occurred.

6. The moving picture encoder according to claim 4, wherein
    the SAD evaluation unit notifies the scene change determination unit of the evaluation result; the scene change determination unit does not determine that a scene change has occurred regardless of a comparison result between the scene change detection value and the scene change detection threshold when the SAD evaluation unit notifies that the summation of absolute differences is smaller than a predetermined threshold.

7. The moving picture encoder according to claim 4, wherein
    an upper limit of a number of frames for which it is not determined that a scene change has occurred is three.

8. The moving picture encoder according to claim 3, further comprising:
- an SAD moving average calculation unit sequentially calculating a moving average of the summation of absolute differences;
- a rate control parameter current value storage unit storing a rate control parameter dynamically updated and used in rate control;
- a rate control parameter initial value storage unit storing an initial value of the rate control parameter; and
- a database, wherein
- each time a scene change occurs, or for each GOP, a rate control parameter stored in the rate control parameter current value storage unit is registered in the database using a moving average of the summation of absolute differences as an index;
- when a scene change occurs, the database is referenced using a summation of absolute differences between a frame relating to the scene change and a subsequent frame;
- a rate control parameter of the corresponding index is read; and
- a value obtained from the read rate control parameter and an initial value of a rate control parameter stored in the rate control parameter initial value storage unit is initially set in the rate control parameter current value storage unit.

9. The moving picture encoder according to claim 1, wherein:
- the scene change determination unit comprises: a first comparison unit for comparing the scene change detection value with the scene change detection threshold and outputting a comparison result; a fixed threshold setting unit for setting a fixed threshold equal to or smaller than the scene change detection threshold; and a second comparison unit for comparing the fixed threshold with the scene change detection value and outputting a comparison result; and
- a signal for notification of an occurrence of a scene change is output when output of the first comparison unit indicates that the scene change detection value is equals or exceeds the scene change detection threshold, and a scene change cancellation signal indicating that scene change detection is canceled is output when output of the first comparison unit indicates that the scene change detection value is smaller than the scene change detection threshold, and when output of the second comparison unit indicates that the scene change detection value equals or exceeds the fixed threshold.

10. The moving picture encoder according to claim 9, wherein
- a signal indicating addition of an amount of information allocated to a GOP is output together with the scene change cancellation signal.

11. The moving picture encoder according to claim 10, wherein
- the addition of the amount of information allocated to a GOP is made with an average allocated information amount for one frame defined as an upper limit.

12. The moving picture encoder according to claim 9, wherein
- a signal indicating initialization of a rate control parameter is output together with the scene change cancellation signal.

13. The moving picture encoder according to claim 12, comprising:
- an SAD moving average calculation unit sequentially calculating a moving average of the summation of absolute differences;
- a rate control parameter current value storage unit storing a rate control parameter dynamically updated and used in rate control;
- a rate control parameter initial value storage unit storing an initial value of the rate control parameter; and
- a database, wherein:
- each time a scene change occurs, or for each GOP, a rate control parameter stored in the rate control parameter current value storage unit is registered in the database using a moving average of the summation of absolute differences as an index; and
- upon receipt of the signal indicating the initialization of the rate control parameter, the rate control parameter stored in the rate control parameter current value storage unit is registered in the database using the moving average of the summation of absolute differences as an index.

14. The moving picture encoder according to claim 13, wherein:
- when a scene change occurs, the database is referenced using a summation of absolute differences between a frame relating to the scene change and a subsequent frame;
- a rate control parameter of the corresponding index is read; and
- a value obtained from the read rate control parameter and an initial value of a rate control parameter stored in the rate control parameter initial value storage unit is initially set in the rate control parameter current value storage unit.

15. The moving picture encoder according to claim 14, wherein:
- upon receipt of the signal indicating the initialization of the rate control parameter, the database is referenced using a summation of absolute differences between a frame relating to the scene change and a subsequent frame;
- a rate control parameter of the corresponding index is read; and
- a value obtained from the read rate control parameter and an initial value of a rate control parameter stored in the rate control parameter initial value storage unit is initially set in the rate control parameter current value storage unit.

16. A moving picture encoder, comprising:
- an SAD arithmetic unit obtaining a summation of absolute differences between original image frames;
- an SAD moving average calculation unit sequentially calculating a moving average of the summation of absolute differences;
- a rate control parameter current value storage unit storing a rate control parameter dynamically updated and used in rate control;
- a rate control parameter initial value storage unit storing an initial value of the rate control parameter; and
- a database, wherein
- each time a scene change occurs, or for each GOP, a rate control parameter stored in the rate control parameter current value storage unit is registered in the database using a moving average of the summation of absolute differences as an index;

when a scene change occurs, the database is referenced using a summation of absolute differences between a frame relating to the scene change and a subsequent frame;
a rate control parameter of the corresponding index is read; and
a value obtained from the read rate control parameter and an initial value of a rate control parameter stored in the rate control parameter initial value storage unit is initially set in the rate control parameter current value storage unit.

17. A non-transitory computer-readable storage medium storing a moving picture encoding program used to direct a computer to perform:

a scene change detection value arithmetic function of calculating a scene change detection value from an original image;
a threshold arithmetic function of calculating a scene change detection threshold depending on a remainder in a VBV buffer; and
a scene change determining function of comparing the scene change detection threshold with a scene change detection value for determination of an occurrence of a scene change, and determining whether or not a scene change has occurred depending on a comparison result.

* * * * *